(12) United States Patent
Chhabra et al.

(10) Patent No.: US 11,847,067 B2
(45) Date of Patent: *Dec. 19, 2023

(54) CRYPTOGRAPHIC PROTECTION OF MEMORY ATTACHED OVER INTERCONNECTS

(71) Applicant: Intel Corporation, Santa Clara, CA (US)

(72) Inventors: Siddhartha Chhabra, Portland, OR (US); Prashant Dewan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/504,609

(22) Filed: Oct. 19, 2021

(65) Prior Publication Data

US 2022/0035749 A1    Feb. 3, 2022

Related U.S. Application Data

(63) Continuation of application No. 17/358,315, filed on Jun. 25, 2021.

(51) Int. Cl.
*G06F 12/14*      (2006.01)
*G06F 13/16*      (2006.01)
*G06F 21/79*      (2013.01)

(52) U.S. Cl.
CPC ...... *G06F 12/1408* (2013.01); *G06F 12/1425* (2013.01); *G06F 12/1466* (2013.01); *G06F 13/1668* (2013.01); *G06F 21/79* (2013.01)

(58) Field of Classification Search
CPC ............. G06F 12/1408; G06F 12/1425; G06F 12/1466; G06F 13/1668; G06F 13/166
See application file for complete search history.

(56) References Cited

U.S. PATENT DOCUMENTS 7,287,140 B1    10/2007   Asanovic et al.
8,494,155 B1    7/2013    Poo et al.
(Continued)

FOREIGN PATENT DOCUMENTS

CN      114647858 A     6/2022
CN      115525335 A     12/2022
(Continued)

OTHER PUBLICATIONS

V. Krishnan, O. Serres and M. Blocksome, "COnfigurable Network Protocol Accelerator (COPA): An Integrated Networking/Accelerator Hardware/Software Framework," 2020 IEEE Symposium on High-Performance Interconnects (HOTI), 2020, pp. 17-24.*
(Continued)

*Primary Examiner* — Pierre Michel Bataille
(74) *Attorney, Agent, or Firm* — Spectrum IP Law Group LLC

(57) ABSTRACT

Methods and apparatus relating to cryptographic protection of memory attached over interconnects are described. In an embodiment, memory stores data and a processor having execution circuitry executes an instruction to program an inline memory expansion logic and a host memory encryption logic with one or more cryptographic keys. The inline memory expansion logic encrypts the data to be written to the memory and decrypts encrypted data to be read from the memory. The memory is coupled to the processor via an interconnect endpoint of a system fabric. Other embodiments are also disclosed and claimed.

18 Claims, 12 Drawing Sheets

(56) References Cited

U.S. PATENT DOCUMENTS

| | | | |
|---|---|---|---|
| 8,516,269 B1 | 8/2013 | Hamlet et al. | |
| 8,819,685 B2 | 8/2014 | Zhang et al. | |
| 9,892,265 B1 | 2/2018 | Tripathy et al. | |
| 10,078,754 B1 | 9/2018 | Brandwine et al. | |
| 10,521,618 B1 | 12/2019 | Zhang et al. | |
| 10,742,421 B1 | 8/2020 | Wentz et al. | |
| 11,205,003 B2 | 12/2021 | Patel et al. | |
| 2002/0129246 A1 | 9/2002 | Blumenau et al. | |
| 2004/0158711 A1 | 8/2004 | Zimmer | |
| 2005/0021986 A1* | 1/2005 | Graunke | G06F 21/85 713/193 |
| 2005/0108532 A1 | 5/2005 | Bajikar | |
| 2005/0232415 A1* | 10/2005 | Little | H04L 9/0863 380/28 |
| 2007/0180239 A1 | 8/2007 | Fujibayashi et al. | |
| 2008/0063197 A1 | 3/2008 | Jaquette et al. | |
| 2008/0065882 A1 | 3/2008 | Goodman et al. | |
| 2008/0222383 A1 | 9/2008 | Spracklen et al. | |
| 2010/0023739 A1 | 1/2010 | Evit-Gurevich et al. | |
| 2011/0002461 A1 | 1/2011 | Erhart et al. | |
| 2011/0060915 A1 | 3/2011 | Tal | |
| 2011/0066837 A1 | 3/2011 | Lee et al. | |
| 2012/0030669 A1 | 2/2012 | Tsirkin | |
| 2012/0054455 A1 | 3/2012 | Wang et al. | |
| 2013/0013934 A1* | 1/2013 | King | G06F 21/00 713/190 |
| 2013/0152099 A1 | 6/2013 | Bass et al. | |
| 2014/0089658 A1 | 3/2014 | Raghuram et al. | |
| 2014/0093074 A1 | 4/2014 | Gotze et al. | |
| 2014/0122902 A1 | 5/2014 | Isozaki et al. | |
| 2014/0258716 A1 | 9/2014 | MacMillan et al. | |
| 2014/0270177 A1 | 9/2014 | Brickell et al. | |
| 2015/0288526 A1 | 10/2015 | Mclean et al. | |
| 2016/0019396 A1 | 1/2016 | Davis et al. | |
| 2016/0246967 A1 | 8/2016 | Gross et al. | |
| 2017/0022494 A1 | 1/2017 | Hill et al. | |
| 2017/0026171 A1 | 1/2017 | Lal et al. | |
| 2017/0149572 A1 | 5/2017 | Wallrabenstein | |
| 2017/0220494 A1 | 8/2017 | Shacham et al. | |
| 2018/0204007 A1 | 7/2018 | Rangayyan | |
| 2019/0097818 A1 | 3/2019 | Lu et al. | |
| 2019/0102568 A1* | 4/2019 | Hausauer | H04L 9/3242 |
| 2019/0102577 A1 | 4/2019 | Gueron et al. | |
| 2019/0149478 A1 | 5/2019 | Mchugh et al. | |
| 2019/0165956 A1 | 5/2019 | Adham et al. | |
| 2019/0165957 A1 | 5/2019 | Abbott et al. | |
| 2019/0324725 A1 | 10/2019 | Wang | |
| 2019/0342093 A1 | 11/2019 | Chhabra et al. | |
| 2019/0361807 A1 | 11/2019 | Desai et al. | |
| 2020/0099658 A1 | 3/2020 | Couillard et al. | |
| 2020/0226263 A1 | 7/2020 | Patel et al. | |
| 2020/0266995 A1 | 8/2020 | Gopal | |
| 2020/0285492 A1 | 9/2020 | Mihajlovski et al. | |
| 2020/0319913 A1 | 10/2020 | Kumar et al. | |
| 2020/0342117 A1 | 10/2020 | Richards et al. | |
| 2021/0004338 A1 | 1/2021 | Marolia et al. | |
| 2021/0149728 A1 | 5/2021 | Wood et al. | |
| 2021/0318966 A1 | 10/2021 | Chhabra et al. | |
| 2021/0319138 A1 | 10/2021 | Dewan et al. | |
| 2022/0035749 A1 | 2/2022 | Chhabra et al. | |
| 2022/0100687 A1* | 3/2022 | Sahin | G06F 3/0664 |
| 2022/0182232 A1* | 6/2022 | Marson | H04L 9/3242 |
| 2022/0318144 A1* | 10/2022 | Bajic | G06N 3/063 |
| 2022/0350503 A1* | 11/2022 | Tkacik | G06F 12/1408 |

FOREIGN PATENT DOCUMENTS

| | | | |
|---|---|---|---|
| CN | 115686740 A | 2/2023 | |
| DE | 102022112551 A1 | 12/2022 | |
| EP | 3547130 A1 | 10/2019 | |
| EP | 3757849 A1 * | 12/2020 | G06F 12/1027 |
| EP | 3757853 A1 * | 12/2020 | G06F 12/0284 |
| EP | 4016358 A1 | 6/2022 | |
| EP | 4124965 A1 | 2/2023 | |
| EP | 4152167 A1 | 3/2023 | |
| GB | 2578135 A | 4/2020 | |
| NL | 2029658 A | 7/2022 | |
| WO | 2021035517 A1 | 3/2021 | |
| WO | WO-2021080732 A1 * | 4/2021 | G06F 13/1668 |
| WO | WO-2021162792 A1 * | 8/2021 | G06F 21/54 |
| WO | 2022132184 A1 | 6/2022 | |
| WO | 2023009641 A1 | 2/2023 | |
| WO | 2023113918 A1 | 6/2023 | |

OTHER PUBLICATIONS

J. Zhu et al., "Enabling Rack-scale Confidential Computing using Heterogeneous Trusted Execution Environment," 2020 IEEE Symposium on Security and Privacy (SP), 2020, pp. 1450-1465.*

Unterluggauer T, Werner M, Mangard S. MEAS: memory encryption and authentication secure against side-channel attacks. J Cryptogr Eng. 2019;9(2):137-158. doi: 10.1007/s13389-018-0180-2. Epub Jan. 25, 2018. PMID: 31231603; PMCID: PMC6555441.*

J. Won, A. Singla, E. Bertino and G. Bollella, "Decentralized Public Key Infrastructure for Internet-of-Things," MILCOM 2018—2018 IEEE Military Communications Conference (MILCOM), Los Angeles, CA, USA, 2018, pp. 907-913.*

C. Priebe, K. Vaswani and M. Costa, "EnclaveDB: A Secure Database Using SGX," 2018 IEEE Symposium on Security and Privacy (SP), San Francisco, CA, USA, 2018, pp. 264-278.*

M. Werner, T. Unterluggauer, R. Schilling, D. Schaffenrath and S. Mangard, "Transparent memory encryption and authentication," 2017 27th International Conference on Field Programmable Logic and Applications (FPL), Ghent, Belgium, 2017, pp. 1-6.*

International Search Report and Written Opinion dated Jun. 30, 2022 for PCT/US2022/021531.

Extended European Search Report for Application No. 22188184.0-1224, dated Jan. 25, 2023, 8 pages.

GDSII, retrieved from https://en.wikipedia.org/w/index.php?title=GDSII&oldid=1003588402 on Jun. 15, 2021.

International Search Report for application No. PCT/US2022/047184, dated Feb. 15, 2023, 3 pages.

Search report issued by the Dutch patent office per EPO report (application 2029658), dated Mar. 22, 2023, 11 pages (with machine translation of cover letter).

Written Opinion for application No. PCT/US2022/047184, dated Feb. 15, 2023, 6 pages.

International Search Report for International application No. PCT/US2022/038546, dated Nov. 18, 2022, 4 pages.

Notice of Grant of NL application No. 2029658, Dutch Patent No. 2029658, dated Jun. 13, 2023, 6 pages.

Written Opinion of the International Searching Authority for International application No. PCT/US2022/038546, dated Nov. 18, 2022, 5 pages.

"Intel Data Streaming Accelerator Architecture Specification," Revision 1.2, 197 pages, Sep. 2021.

"Intel® QuickAssist Technology (Intel® QAT)—Data Center Performance," downloaded Jun. 12, 2022, from "https://www.intel.com/content/www/us/en/architecture-and-technology/intel-quick-assist-technology-overview.html," 6 pages.

"Smart Data Accelerator Interface ("SDXI") Specification," Version 0.9.0 rev 1, SNIA Advancing Storage & Information Technology, 109 pages.

IBM Cloud Education, "What is Multi-Tenant?" IBM Cloud Learn Hub, retrieved on Dec. 2, 2021 from https://www.ibm.com/cloud/learn/multi-tenant.

International Preliminary Report on Patentability for application No. PCT/US2020/066279, dated Jun. 13, 2023, 11 pages.

Iyer, Shyamkumar, "Introducing Smart Data Acceleration Interface (SDXI)," In-Memory Computing Summit (Oct. 28, 2020).

Jiang, David, "Introducing the Intel Data Streaming Accelerator (Intel DSA)," retrieved on Dec. 1, 2021 from https://01.org/blogs/2019/introducing-intel-data-streaming-accelerator.

Wikipedia, "Disk encryption theory," downloaded from "https://en.wikipedia.org/wiki/Disk_encryption_theory#XTS" on Jul. 25, 2023, 7 pages.

U.S. Appl. No. 17/551,166, filed Dec. 14, 2021, Saurabh Gayen.

(56) References Cited

OTHER PUBLICATIONS

U.S. Appl. No. 17/711,928, filed Apr. 1, 2022, Narayan Ranganathan.
U.S. Appl. No. 17/854,159, filed Jun. 30, 2022, Utkarsh Y. Kakaiya.
U.S. Appl. No. 17/854,322, filed Jun. 30, 2022, Utkarsh Y. Kakaiya.
U.S. Appl. No. 17/875,198, filed Jun. 27, 2022, Rajesh M. Sankaran.
European Search Report, Application No. EP22181090, dated Dec. 7, 2022, 7 pages.
Partial European Search Report for application No. 23156058.2, dated Jul. 26, 2023, 14 pages.

\* cited by examiner

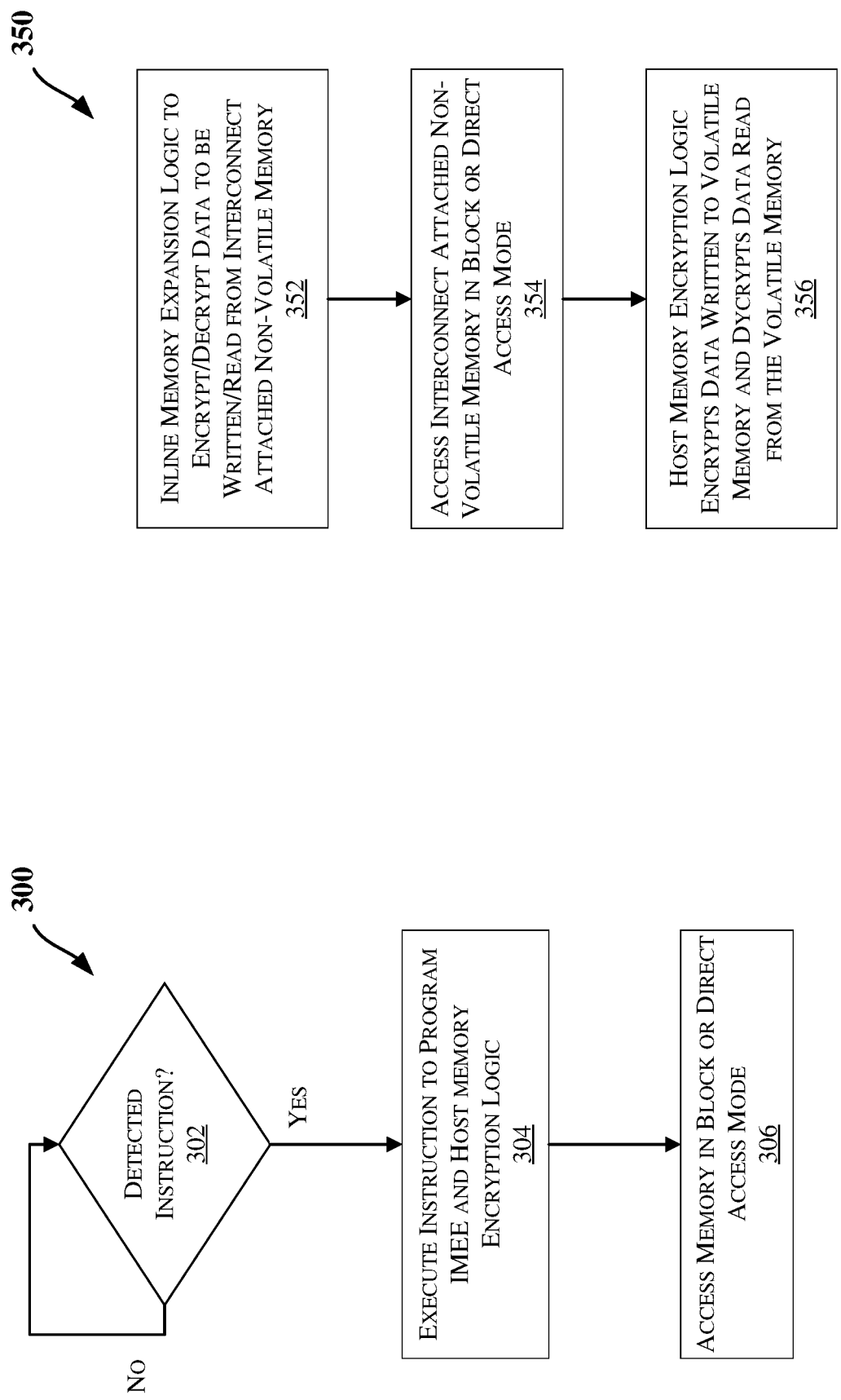

| FIELD | OFFSET (BYTES) | SIZE (BYTES) | COMMENTS |
|---|---|---|---|
| KEYID | 0 | 2 | Key Identifier |
| KEYID_CTRL | 2 | 4 | KeyID control:<br>Bits [7:0]: COMMAND<br>Bits [23:8]: CRYPTO_ALG<br>Bits [31:24]: RSVD, MBZ |
| BLOCK_SIZE | 6 | 8 | Size of the block |
| MEMORY_RANGE_FOR_BLOC_ACCESS | 9 | 25 | BASE+MASK |
| RSVD | 34 | 20 | RSVD, MBZ |
| KEY_FIELD_1 | 64 | 64 | Software supplied KeyID data key or entropy for KeyID data key |
| KEY_FIELD_2 | 128 | 64 | Software supplied KeyID tweak key or entropy for KeyID tweak key |

FIG. 3C

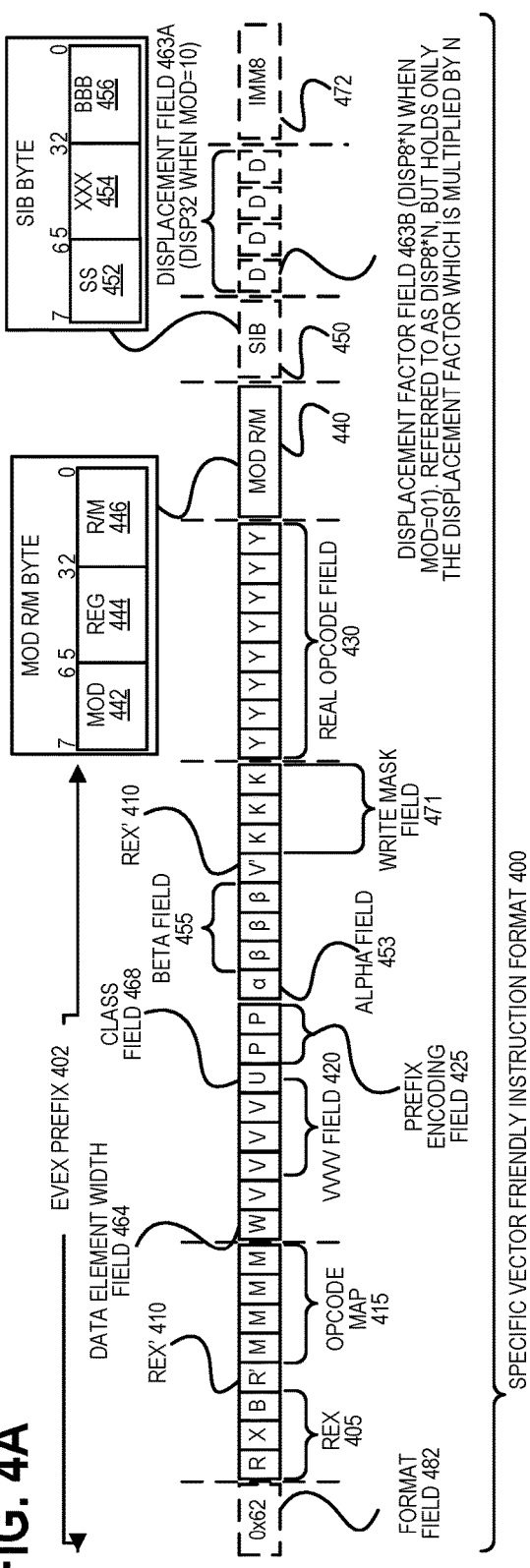
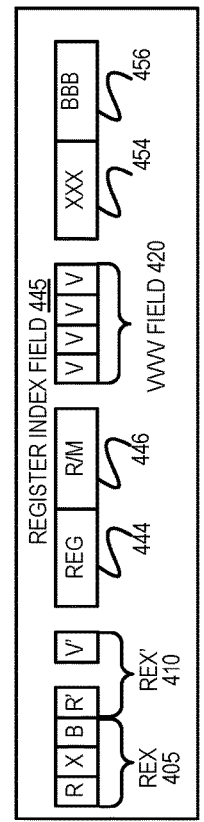
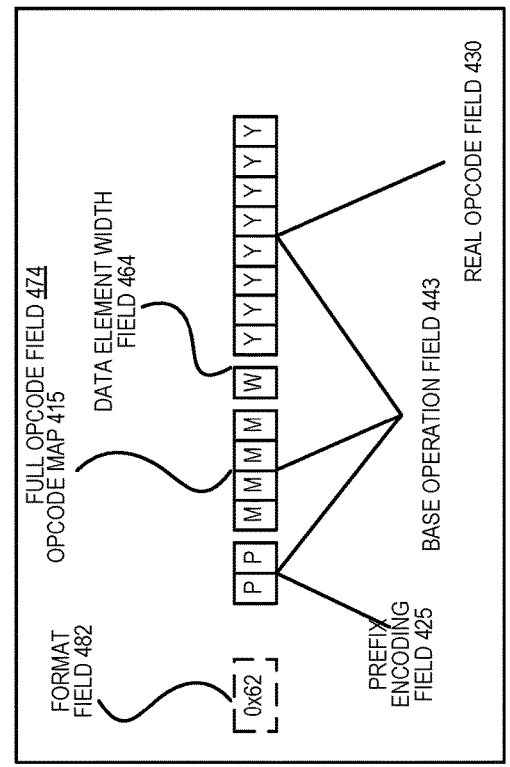
FIG. 4A
FIG. 4B
FIG. 4C

CRYPTOGRAPHIC PROTECTION OF MEMORY ATTACHED OVER INTERCONNECTS

FIELD

The present disclosure generally relates to the field of electronics. More particularly, an embodiment relates to techniques for provision of cryptographic protection of memory attached over interconnects.

BACKGROUND

With growing security needs, memory cryptographic engines have become a requirement for different usage models to protect code and/or data resident in main memory. However, some memory systems may use unprotected memory attached to interconnects such as Compute Express Link™ (CXL™), which is an open standard interconnection for high-speed processor or central processing unit (CPU)-to-device and CPU-to-memory, designed to accelerate next-generation data center performance. CXL is built on the PCI Express (PCIe) physical and electrical interface with protocols in three key areas: input/output (I/O), memory, and cache coherence.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIGS. 3A and 3B illustrate flow diagrams for methods, according to some embodiments.

FIG. 3C illustrates a key programming table according to an embodiment.

FIG. 4A is a block diagram illustrating an exemplary instruction format according to embodiments.

FIG. 4B is a block diagram illustrating the fields of the instruction format that make up the full opcode field according to one embodiment.

FIG. 4C is a block diagram illustrating the fields of the instruction format that make up the register index field according to one embodiment.

DETAILED DESCRIPTION

Figure 1:
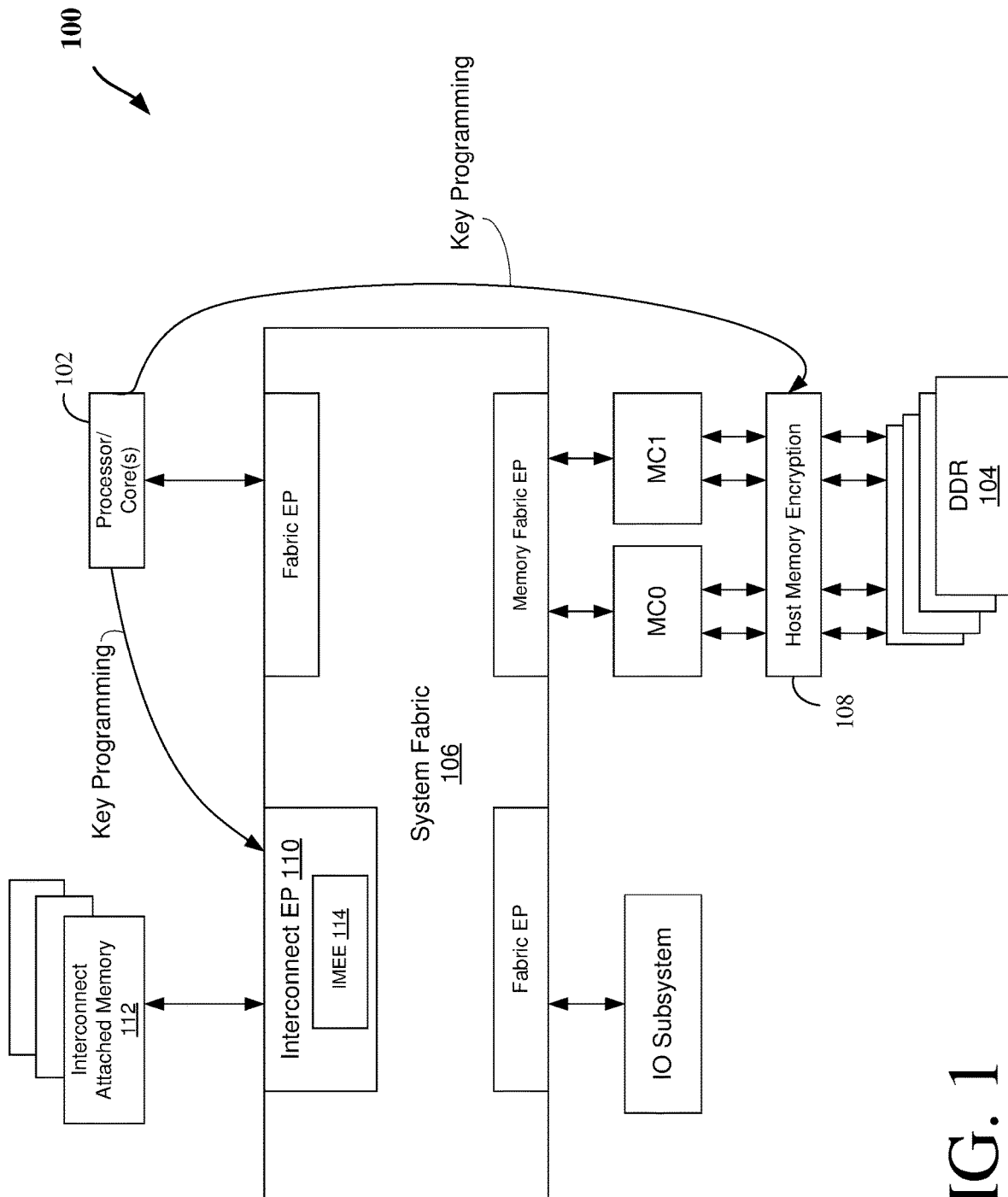
FIG. 1 illustrates a block diagram of a system with an inline memory expansion engine, according to an embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

As mentioned above, some memory systems may use unprotected memory attached to interconnects such as Compute Express Link™ (CXL™). In such a scenario, while the host attached memory may be cryptographically protected by an engine (that may be incorporated in a processor such as a Multi-Key Total Memory Encryption (MKTME) engine), the CXL attached memory is not since the accesses to that memory do not necessarily go through the host cryptographic engine. This is not specific to a single platform as the CXL ports may typically be separate from the memory path and, hence, will need separate protection mechanisms.

To this end, some embodiments provide a mechanism to protect the memory attached to interconnects (such as CXL), e.g., by introducing an inline encryption engine in the CXL (or other interconnect attached) endpoint (EP). In an embodiment, a processor core key programming instruction or ISA (Instruction Set Architecture) is configured to program the host memory encryption and the expansion (e.g., interconnect attached) memory encryption engine. In at least some embodiments, one or more of the new instruction(s) discussed herein may follow the EVEX format (such as discussed with reference to FIGS. 4A-4D).

Moreover, memory expansion is gaining increasing importance as it can help reduce the overall TCO (Total Cost of Ownership) for cloud service providers by allowing the CSP (Content Service Providers) to pool the memory (e.g., the same memory is partitioned and shared) across hosts, minimizing the cost of memory and maximizing utilization. However, with memory protection (such a customer data encryption) becoming a minimum compliance requirement for CSPs, such a memory model cannot be supported without protecting the memory attached over an interconnect (such as CXL). Also, while some embodiments are discussed with reference to CXL as an example interface for memory expansion, one or more of the embodiments may be used to protect memory attached via any interface or interconnect. Hence, some embodiments bridge the gap to making memory expansion secure, thereby making the techniques useful for confidential computing in general (including for, e.g., Trust Domain Extension (TDX), Software Guard Extension (SGX), MKTME, etc.).

FIG. 1 illustrates a block diagram of a system 100 with an inline memory expansion engine, according to an embodiment. The system 100 includes one or more processor/cores 102 that communicate with main memory 104 (such as one or more Double Data Rate (DDR) Dynamic Random Access Memory (DRAM) modules) via a system fabric 106.

As shown, the system fabric 106 includes a memory fabric EP (or endpoint) that communicates with memory 104 via one or more memory controllers (MCO and MC1). A host memory encryption engine 108 encrypts/decrypts data stored/read from the memory 104. The system fabric 106 also includes other endpoints to provide a communication channel with other components of system 100, such as IO (Input/Output) subsystem (e.g., to couple non-volatile memory to system 100 such as a disk drive, NVMe (Non-Volatile Memory express) device, Solid State Drive (SSD), etc.), as well as an interconnect EP 110 (which may operate in accordance with CXL™ protocol in at least one embodiment). One or more (e.g., CXL) memory modules 112 attached to the interconnect EP 110 may be protected cryptographically by an Inline Memory Expansion Engine (IMEE) 114, in an embodiment. In one embodiment, system 100 may be implemented as a System On Chip (SOC or SoC).

In an embodiment, the CXL memory 112 can be accessed in block mode using CXL.IO as a cache for some of the accelerators on a SOC. As discussed herein, CXL.IO refers to a protocol which is an enhanced version of a PCIe 5.0 protocol that can be used for initialization, link-up, device discovery and enumeration, and register access. It provides a non-coherent load/store interface for I/O devices.

For example, a storage controller such as an SPI (Serial Peripheral Interface) controller or a UFS (Universal Flash Storage) controller might cache the data in CXL attached memory since retrieving the data from this memory will be much faster than going to the actual flash memory itself. As a result, the encryption semantics of writing and reading the memory will change and the Inline Memory Expansion Engine (IMEE) discussed herein is aware of the access semantics in an embodiment. From the memory device perspective, the device reserves memory to be used in one of the two modes, block access mode or direct access mode. Generally, a given memory page cannot be simultaneously accessible in both modes.

When a blocked mode transaction is received, the IMEE needs to know the block size and for that block size, AES-XTS (Advanced Encryption Standard (AES) XEX-based Tweakable-codebook mode with ciphertext Stealing (XTS) (e.g., with 256b keys)) engine generates a tweak using the block address or a nonce provided for that block. CEPROG or a Crypto Engine Programming instruction (discussed herein and outlined below) enables the software to specify the block size. In an embodiment, the CEPROG instruction is used for key programming. In addition, the transaction in the CXL.IO packet contains the block address.

As mentioned above, in the current systems, main memory is attached to the host directly and memory expansion is viewed as a low TCO alternative to increase memory supported on a platform. Accordingly, an embodiment introduces a new cryptographic engine, e.g., in the CXL port (or another interconnect port or EP) on a platform/SoC.

In one embodiment, a key programming ISA/instruction is configured to program the host encryption engine 108 as well as the new encryption engine (IMEE) 114. In at least one embodiment, the memory across CXL can be used as 1LM or 2LM host attached memory which may operate as a cache to the CXL attached memory, as will be further discussed with reference to FIG. 2.

Figure 2:
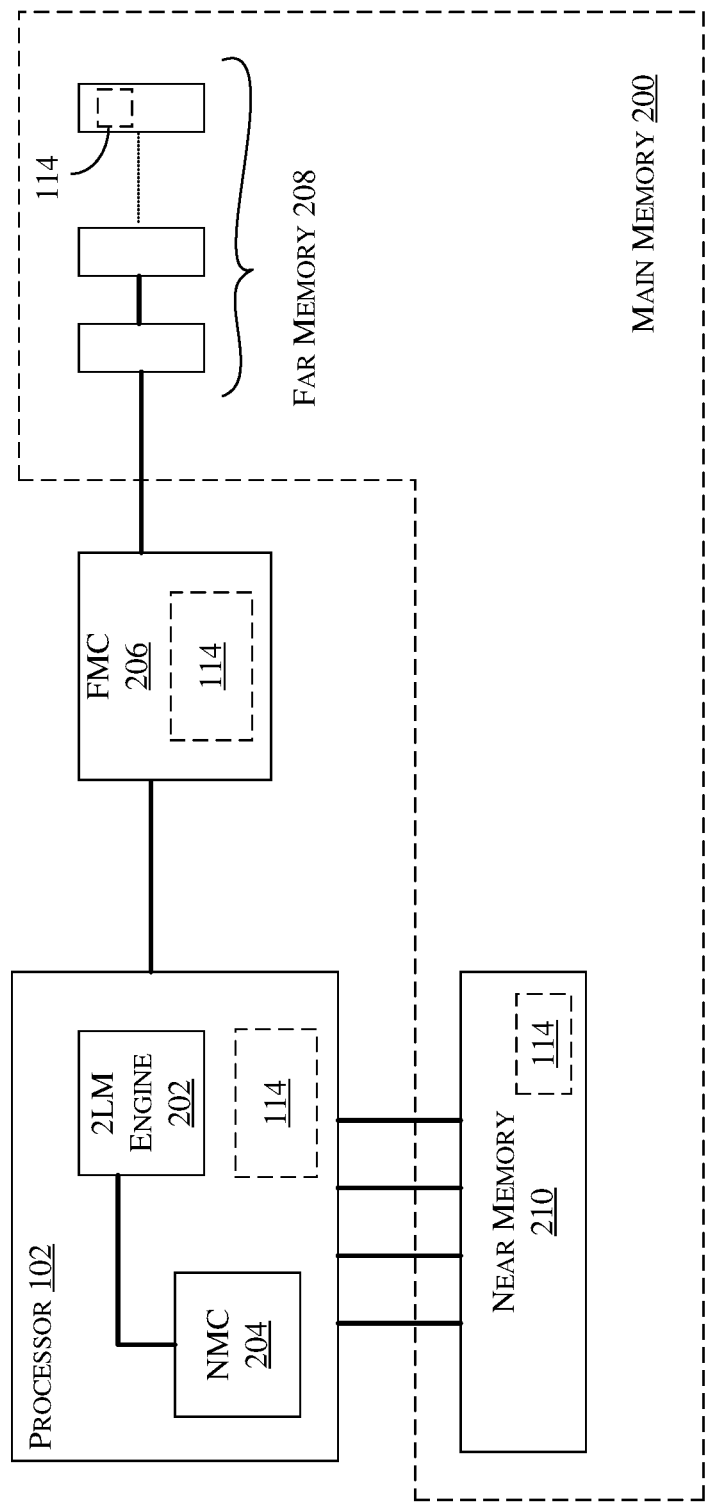
FIG. 2 illustrates a block diagram of two-level system main memory, according to an embodiment.

FIG. 2 illustrates a block diagram of two-level system main memory, according to an embodiment. Some embodiments are directed towards system main memory 200 comprising two levels of memory (alternatively referred to herein as "2LM") that include cached subsets of system disk level storage (in addition to, for example, run-time data). This main memory includes a first level memory 210 (alternatively referred to herein as "near memory") comprising smaller and/or faster memory made of, for example, volatile memory (e.g., including DRAM (Dynamic Random Access Memory) such as 104), NVM (Non-Volatile Memory), etc.; and a second level memory 208 (alternatively referred to herein as "far memory") which comprises larger and/or relatively slower (with respect to the near memory) volatile memory (e.g., memory 104) or nonvolatile memory storage (e.g., NVM).

In an embodiment, the far memory is presented as "main memory" to the host Operating System (OS), while the near memory is a cache for the far memory that is transparent to the OS, thus rendering the embodiments described below to appear the same as general main memory solutions. The management of the two-level memory may be done by a combination of logic and modules executed via the host central processing unit (CPU) 102 (which is interchangeably referred to herein as "processor"). Near memory may be coupled to the host system CPU via one or more high bandwidth, low latency links, buses, or interconnects for efficient processing such as the system fabric 106. Far memory may be coupled to the CPU via one or more low bandwidth, high latency links, buses, or interconnects (as compared to that of the near memory), e.g., that may operate in accordance with CXL in at least one embodiment.

Referring to FIG. 2, main memory 200 provides run-time data storage and access to the contents of system disk storage memory (such as a disk drive or NVMe device) to CPU 102. The CPU may include cache memory, which would store a subset of the contents of main memory 200. Far memory may comprise either volatile or nonvolatile memory as discussed herein. In such embodiments, near memory 210 serves a low-latency and high-bandwidth (i.e., for CPU 102 access) cache of far memory 208, which may have considerably lower bandwidth and higher latency (i.e., for CPU 102 access).

In an embodiment, near memory 210 is managed by Near Memory Controller (NMC) 204, while far memory 208 is managed by Far Memory Controller (FMC) 206. FMC 206 reports far memory 208 to the system operating system (OS) as main memory (i.e., the system OS recognizes the size of far memory 208 as the size of system main memory 200). The system OS and system applications are "unaware" of the existence of near memory 210 as it is a "transparent" cache of far memory 208.

CPU 102 further comprises 2LM engine module/logic 202. The "2LM engine" is a logical construct that may comprise hardware and/or micro-code extensions to support two-level main memory 200. For example, 2LM engine 202 may maintain a full tag table that tracks the status of all architecturally visible elements of far memory 208. For example, when CPU 102 attempts to access a specific data segment in main memory 200, 2LM engine 202 determines whether the data segment is included in near memory 210; if it is not, 2LM engine 202 fetches the data segment in far memory 208 and subsequently writes the data segment to near memory 210 (similar to a cache miss). It is to be understood that, because near memory 210 acts as a "cache"

of far memory 208, 2LM engine 202 may further execute data perfecting or similar cache efficiency processes.

Further, 2LM engine 202 may manage other aspects of far memory 208. For example, in embodiments where far memory 208 comprises nonvolatile memory (e.g., NVM), it is understood that nonvolatile memory such as flash is subject to degradation of memory segments due to significant reads/writes. Thus, 2LM engine 202 may execute functions including wear-leveling, bad-block avoidance, and the like in a manner transparent to system software. For example, executing wear-leveling logic may include selecting segments from a free pool of clean unmapped segments in far memory 208 that have a relatively low erase cycle count.

In some embodiments, near memory 210 may be smaller in size than far memory 208, although the exact ratio may vary based on, for example, intended system use. In such embodiments, it is to be understood that because far memory 208 may comprise denser and/or cheaper nonvolatile memory, the size of the main memory 200 may be increased cheaply and efficiently and independent of the amount of DRAM (i.e., near memory 210) in the system.

In one embodiment, far memory 208 stores data in compressed form and near memory 210 includes the corresponding uncompressed version. Thus, when near memory 210 request content of far memory 208 (which could be a non-volatile DIMM in an embodiment), FMC 206 retrieves the content and returns it in fixed payload sizes tailored to match the compression algorithm in use (e.g., a 256B transfer).

As shown in FIG. 2, IMEE 114 may be provided in one or more locations in FIG. 2, depending on the implementation.

Referring to FIGS. 1 and 2, any access to CXL memory is encrypted on writes and decrypted on reads by IMEE 114. The host memory encryption engine 108 and the IMEE 114 need to be programmed with encryption keys. To this end, an instruction (sometimes referred to as "CEPROG") is used to program keys for both cryptographic engines.

In an embodiment, the CEPROG instruction is invoked by software for configuring platform features. CEPROG may support multiple leaves and a leaf function is invoked by setting the appropriate leaf value in a register, e.g., where EAX. RBX, RCX, and RDX have a leaf-specific purpose. An attempt to execute an undefined leaf results in a #GP(0). In an embodiment, the instruction may generate an error code in response to execution of undefined leaves. In one embodiment, CEPROG is a package scoped instruction and likewise, needs to be executed once per physical package to configure the desired platform feature.

FIG. 3A illustrates a flow diagram of a method 300 to provide cryptographic protection of memory, according to an embodiment. One or more operations of method 300 may be performed by one or more components of FIGS. 1-2.

Referring to FIGS. 1-3A, once an instruction is detected at an operation 302, operation 304 executes the instruction (e.g., at execution circuitry of a processor such as discussed with reference to FIG. 6B) to program an inline memory expansion logic (e.g., IMEE 114) and a host memory encryption logic (e.g., logic 108) with one or more cryptographic keys. In an embodiment, the inline memory expansion logic encrypts the data to be written to the memory and decrypts encrypted data to be read from the memory. As shown in FIG. 1, the memory is coupled to the processor via an interconnect endpoint of a system fabric in an embodiment. Also, the interconnect endpoint may operate in accordance with Compute Express Link™ (CXL™) protocol. As discussed with reference to FIG. 2, the memory may include a one level memory or a two level memory. At an operation 306, the memory is accessed in block mode or direct access mode. In an embodiment, the host memory encryption logic encrypts data to be written to dynamic random access memory (e.g., DDR 104) and decrypts encrypted data to be read from the dynamic random access memory. In one embodiment, the memory and the dynamic random access memory are accessed as a single system main memory. Further, the memory may be a far memory in a two level memory system and the dynamic random access memory is a near memory in the two level memory system (see, e.g., FIG. 2).

FIG. 3B illustrates a diagram of a method 350 to provide cryptographic protection of memory, according to an embodiment. One or more operations of method 350 may be performed by one or more components of FIGS. 1-2.

Referring to FIGS. 1-3B, at an operation 352, an inline memory expansion logic (e.g., IMEE 114), which may be coupled to an interconnect endpoint (e.g., endpoint 110) of a system fabric (e.g., system fabric 106), encrypts data to be written to an interconnect attached non-volatile memory (e.g., memory 112) and decrypts encrypted data to be read from the interconnect attached non-volatile memory. In an embodiment, the system fabric couples the interconnect attached non-volatile memory and volatile memory to a processor. In another embodiment, the interconnect endpoint operates in accordance with Compute Express Link™ (CXL™) protocol. At an operation 354, the interconnect attached non-volatile memory is accessed in block mode or direct access mode. At an operation 356, host memory encryption logic (e.g., logic 108) encrypts data to be written to the volatile memory (e.g., DDR 104) and decrypts encrypted data to be read from the volatile memory.

Furthermore, the MKTME_KEY_PROGRAM leaf of CEPROG can be used by software to manage the key associated with a KeyID (or key identifier). The leaf function is invoked by setting the leaf value of '0' in EAX and the address of MKTME_KEY_PROGRAM_STRUCT in RBX. Successful execution of the leaf clears RAX (set to zero) and ZF, CF, PF, AF, OF, and SF are cleared. In case of failure, the failure reason is indicated in RAX with ZF set to 1 and CF, PF, AF, OF, and SF are cleared. The MKTME_KEY_PROGRAM leaf works using the MKTME_KEY_PROGRAM_STRUCT in memory, as shown in table of FIG. 3C.

More particularly, FIG. 3C illustrates a key programming table 390 according to an embodiment. In the table of FIG. 3C, the MEMORY_RANGE_FOR_BLOCK_ACCESS provides a range (base and mask) of physical addresses that are used for block access. CXL EP (shown in FIG. 1 as item 110) will enforce the separation between block accessed and direct accessed memory. These ranges are not used for load-store accesses and the crypto controller (e.g., IMEE 114) will drop the packets that come as load accesses in this range. The block size is likely to be 4K Bytes but the above field provides an option for specifying the block size. Hence, embodiments are not limited to 4K Bytes and other sizes may be used.

Additionally, some embodiments may be applied in computing systems that include one or more processors (e.g., where the one or more processors may include one or more processor cores), such as those discussed with reference to FIG. 1 et seq., including for example a desktop computer, a work station, a computer server, a server blade, or a mobile computing device. The mobile computing device may include a smartphone, tablet, UMPC (Ultra-Mobile Personal Computer), laptop computer, Ultrabook™ computing device, wearable devices (such as a smart watch, smart ring, smart bracelet, or smart glasses), etc.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

While embodiments will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

FIG. 4A is a block diagram illustrating an exemplary instruction format according to embodiments. FIG. 4A shows an instruction format 400 that is specific in the sense that it specifies the location, size, interpretation, and order of the fields, as well as values for some of those fields. The instruction format 400 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions.

EVEX Prefix (Bytes 0-3) 402—is encoded in a four-byte form.

Format Field 482 (EVEX Byte 0, bits [7:0])—the first byte (EVEX Byte 0) is the format field 482 and it contains 0x62 (the unique value used for distinguishing the vector friendly instruction format in one embodiment).

The second-fourth bytes (EVEX Bytes 1-3) include a number of bit fields providing specific capability.

REX field 405 (EVEX Byte 1, bits [7-5])—consists of a EVEX.R bit field (EVEX Byte 1, bit [7]-R), EVEX.X bit field (EVEX byte 1, bit [6]-X), and 457BEX byte 1, bit[5]-B). The EVEX.R, EVEX.X, and EVEX.B bit fields provide the same functionality as the corresponding VEX bit fields, and are encoded using is complement form, i.e., ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field QAc10—this is the EVEX.R' bit field (EVEX Byte 1, bit [4]-R') that is used to encode either the upper 16 or lower 16 of the extended 32 register set. In one embodiment, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 415 (EVEX byte 1, bits [3:0]-mmmm)—its content encodes an implied leading opcode byte (0F, 0F 38, or 0F 3).

Data element width field 464 (EVEX byte 2, bit [7]-W)—is represented by the notation EVEX.W. EVEX.W is used to define the granularity (size) of the datatype (either 32-bit data elements or 64-bit data elements). This field is optional in the sense that it is not needed if only one data element width is supported and/or data element widths are supported using some aspect of the opcodes.

EVEX.vvvv 420 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 420 encodes the 4 low-order bits of the first source register specifier stored in inverted (1s complement) form. Depending on the instruction, an extra different EVEX bit field is used to extend the specifier size to 32 registers.

EVEX.0 468 Class field (EVEX byte 2, bit [2]-U)—If EVEX.U=0, it indicates class A (support merging-writemasking) or EVEX.U0; if EVEX.U=1, it indicates class B (support zeroing and merging-writemasking) or EVEX.U1.

Prefix encoding field 425 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 453 (EVEX byte 3, bit [7]-EH; also known as EVEX.EH, EVEX.rs, EVEX.RL, EVEX.writemask control, and EVEX.N; also illustrated with α)—its content distinguishes which one of the different augmentation operation types are to be performed.

Beta field 455 (EVEX byte 3, bits [6:4]-SSS, also known as EVEX.s2-0, EVEX.r2-0, EVEX.rr1, EVEX.LL0, EVEX.LLB; also illustrated with βββ)—distinguishes which of the operations of a specified type are to be performed.

REX' field 410—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Writemask field 471 (EVEX byte 3, bits [2:0]-kkk)—its content specifies the index of a register in the writemask registers. In one embodiment, the specific value EVEX kkk=000 has a special behavior implying no writemask is used for the particular instruction (this may be implemented in a variety of ways including the use of a writemask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the writemask field 471 allows for partial vector operations, including loads, stores, arithmetic, logical, etc. While embodiments are described in which the writemask field's 471 content selects one of a number of writemask registers that contains the writemask to be used (and thus the writemask field's 471 content indirectly identifies that masking to be performed), alternative embodiments instead or additional allow the mask write field's 471 content to directly specify the masking to be performed.

Real Opcode Field 430 (Byte 4) is also known as the opcode byte. Part of the opcode is specified in this field.

MOD R/M Field 440 (Byte 5) includes MOD field 442, register index field 444, and R/M field 446. The MOD field's 442 content distinguishes between memory access and non-memory access operations. The role of register index field 444 can be summarized to two situations: encoding either the destination register operand or a source register operand, or be treated as an opcode extension and not used to encode any instruction operand. The content of register index field 444, directly or through address generation, specifies the locations of the source and destination operands, be they in registers or in memory. These include a sufficient number of bits to select N registers from a PxQ (e.g., 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

The role of R/M field 446 may include the following: encoding the instruction operand that references a memory address, or encoding either the destination register operand or a source register operand.

Scale, Index, Base (SIB) Byte (Byte 6)—The scale field's 450 content allows for the scaling of the index field's content for memory address generation (e.g., for address generation that uses 2scale*index+base). SIB.xxx 454 and SIB.bbb 456—the contents of these fields have been previously referred to with regard to the register indexes Xxxx and Bbbb.

Displacement field 463A (Bytes 7-10)—when MOD field 442 contains 10, bytes 7-10 are the displacement field 463A, and it works the same as the legacy 32-bit displacement (disp32) and works at byte granularity. This may be used as part of memory address generation (e.g., for address generation that uses 2scale*index+base+displacement).

Displacement factor field 463B (Byte 7)—when MOD field 442 contains 01, byte 7 is the displacement factor field 463B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 463B is a reinterpretation of disp8; when using displacement factor field 463B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 463B substitutes the legacy x86 instruction set 8-bit displacement. Thus, the displacement factor field 463B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 472 allows for the specification of an immediate. This field is optional in the sense that is it not present in an implementation of the generic vector friendly format that does not support immediate and it is not present in instructions that do not use an immediate.

Full Opcode Field

FIG. 4B is a block diagram illustrating the fields of the instruction format 400 that make up the full opcode field 474 according to one embodiment. Specifically, the full opcode field 474 includes the format field 482, the base operation field 443, and the data element width (W) field 463. The base operation field 443 includes the prefix encoding field 425, the opcode map field 415, and the real opcode field 430.

Register Index Field

FIG. 4C is a block diagram illustrating the fields of the format 400 that make up the register index field 445 according to one embodiment. Specifically, the register index field 445 includes the REX field 405, the REX' field 410, the MODR/M.reg field 444, the MODR/M.r/m field 446, the VVVV field 420, xxx field 454, and the bbb field 456.

Augmentation Operation Field

Figure 4D:
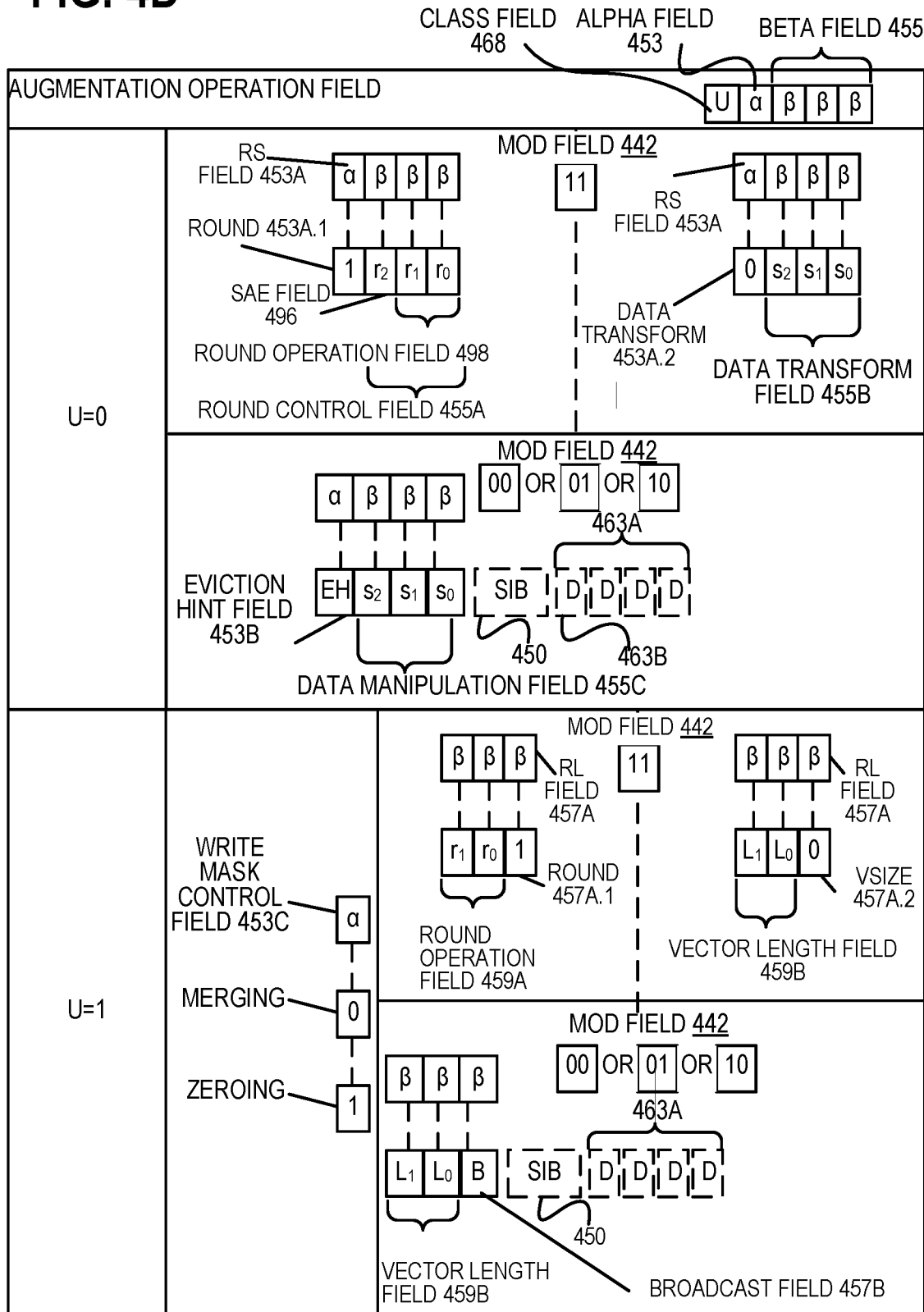
FIG. 4D is a block diagram illustrating the fields of the instruction format that make up the augmentation operation field according to one embodiment.

FIG. 4D is a block diagram illustrating the fields of the instruction format 400 that make up an augmentation operation field according to one embodiment. When the class (U) field 468 contains 0, it signifies EVEX.U0 (class A 468A); when it contains 1, it signifies EVEX.U1 (class B 468B). When U=0 and the MOD field 442 contains 11 (signifying a no memory access operation), the alpha field 453 (EVEX byte 3, bit [7]-EH) is interpreted as the rs field 453A. When the rs field 453A contains a 1 (round 453A.1), the beta field 455 (EVEX byte 3, bits [6:4]-SSS) is interpreted as the round control field 455A. The round control field 455A includes a one bit SAE field 496 and a two bit round operation field 498. When the rs field 453A contains a 0 (data transform 453A.2), the beta field 455 (EVEX byte 3, bits [6:4]-SSS) is interpreted as a three bit data transform field 455B. When U=0 and the MOD field 442 contains 00, 01, or 10 (signifying a memory access operation), the alpha field 453 (EVEX byte 3, bit [7]-EH) is interpreted as the eviction hint (EH) field 453B and the beta field 455 (EVEX byte 3, bits [6:4]-SSS) is interpreted as a three bit data manipulation field 455C.

When U=1, the alpha field 453 (EVEX byte 3, bit [7]-EH) is interpreted as the writemask control (Z) field 453C. When U=1 and the MOD field 442 contains 11 (signifying a no memory access operation), part of the beta field 455 (EVEX byte 3, bit [4]-S0) is interpreted as the RL field 457A; when it contains a 1 (round 457A.1) the rest of the beta field 455 (EVEX byte 3, bit [6-5]-S2-1) is interpreted as the round operation field 459A, while when the RL field 457A contains a 0 (VSIZE 457.A2) the rest of the beta field 455 (EVEX byte 3, bit [6-5]-S2-1) is interpreted as the vector length field 459B (EVEX byte 3, bit [6-5]-L1-0). When U=1 and the MOD field 442 contains 00, 01, or 10 (signifying a memory access operation), the beta field 455 (EVEX byte 3, bits [6:4]-SSS) is interpreted as the vector length field 459B (EVEX byte 3, bit [6-5]-L1-0) and the broadcast field 457B (EVEX byte 3, bit [4]-B).

Exemplary Register Architecture

Figure 5:
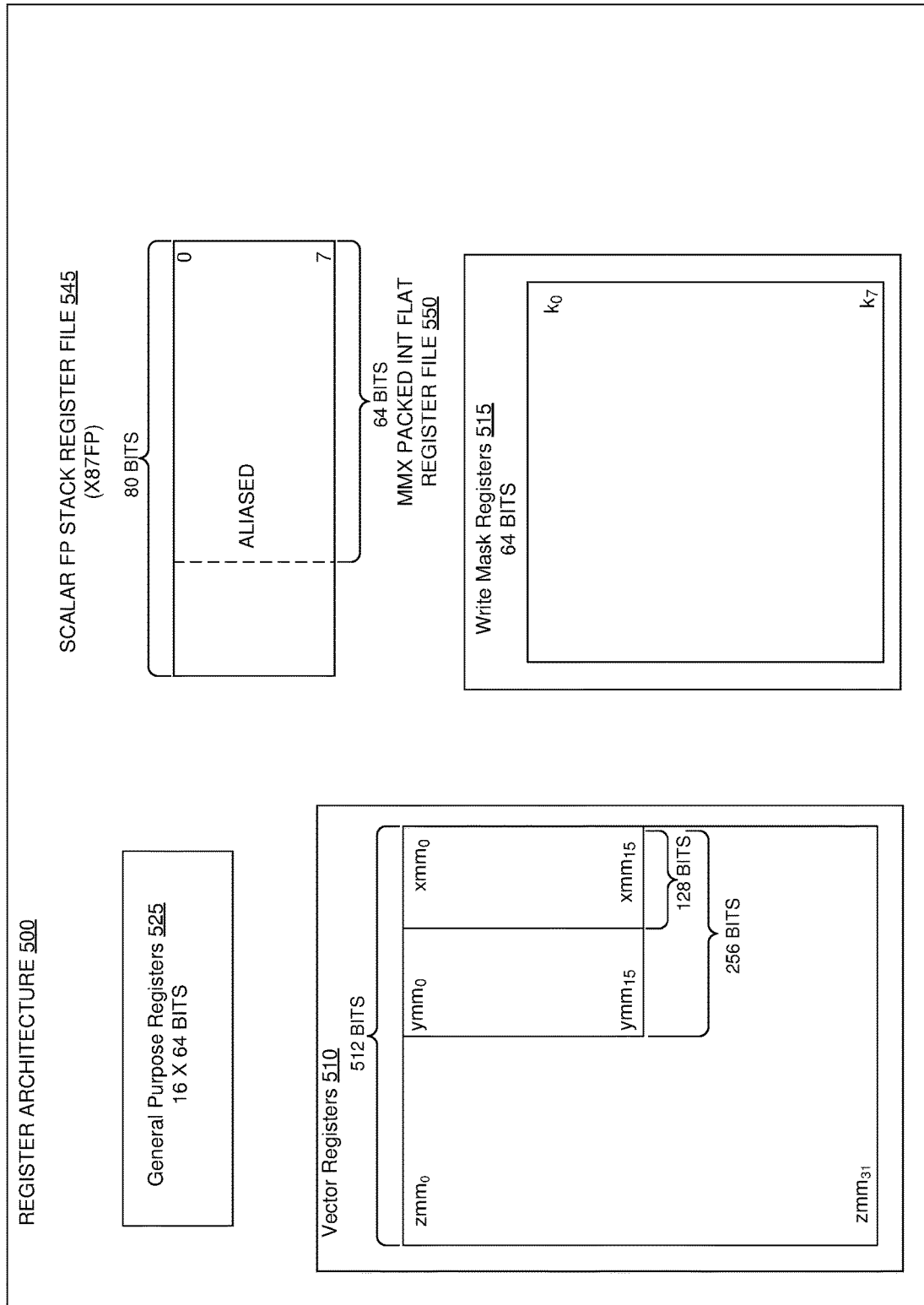
FIG. 5 is a block diagram of a register architecture according to one embodiment.

FIG. 5 is a block diagram of a register architecture 500 according to one embodiment. In the embodiment illustrated, there are 32 vector registers 510 that are 512 bits wide; these registers are referenced as ZMM0 through ZMM31. The lower order 256 bits of the lower 16 ZMM registers are overlaid on registers YMM0-16. The lower order 128 bits of the lower 16 ZMM registers (the lower order 128 bits of the YMM registers) are overlaid on registers XMM0-15. In other words, the vector length field 459B selects between a maximum length and one or more other shorter lengths, where each such shorter length is half the length of the preceding length; and instructions templates without the vector length field 459B operate on the maximum vector length. Further, in one embodiment, the class B instruction templates of the instruction format 400 operate on packed or scalar single/double-precision floating point data and packed or scalar integer data. Scalar operations are operations performed on the lowest order data element position in a ZMM/YMM/XMM register; the higher order data element positions are either left the same as they were prior to the instruction or zeroed depending on the embodiment.

Writemask registers 515—in the embodiment illustrated, there are 8 writemask registers (k0 through k7), each 64 bits in size. In an alternate embodiment, the writemask registers 515 are 16 bits in size. In some embodiments, the vector mask register k0 cannot be used as a writemask; when the encoding that would normally indicate k0 is used for a writemask, it selects a hardwired writemask of 0xFFFF, effectively disabling writemasking for that instruction.

General-purpose registers 525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 545, on which is aliased the MMX packed integer flat register file 550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU (Central Processing Unit) including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores);

and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

Figure 6:
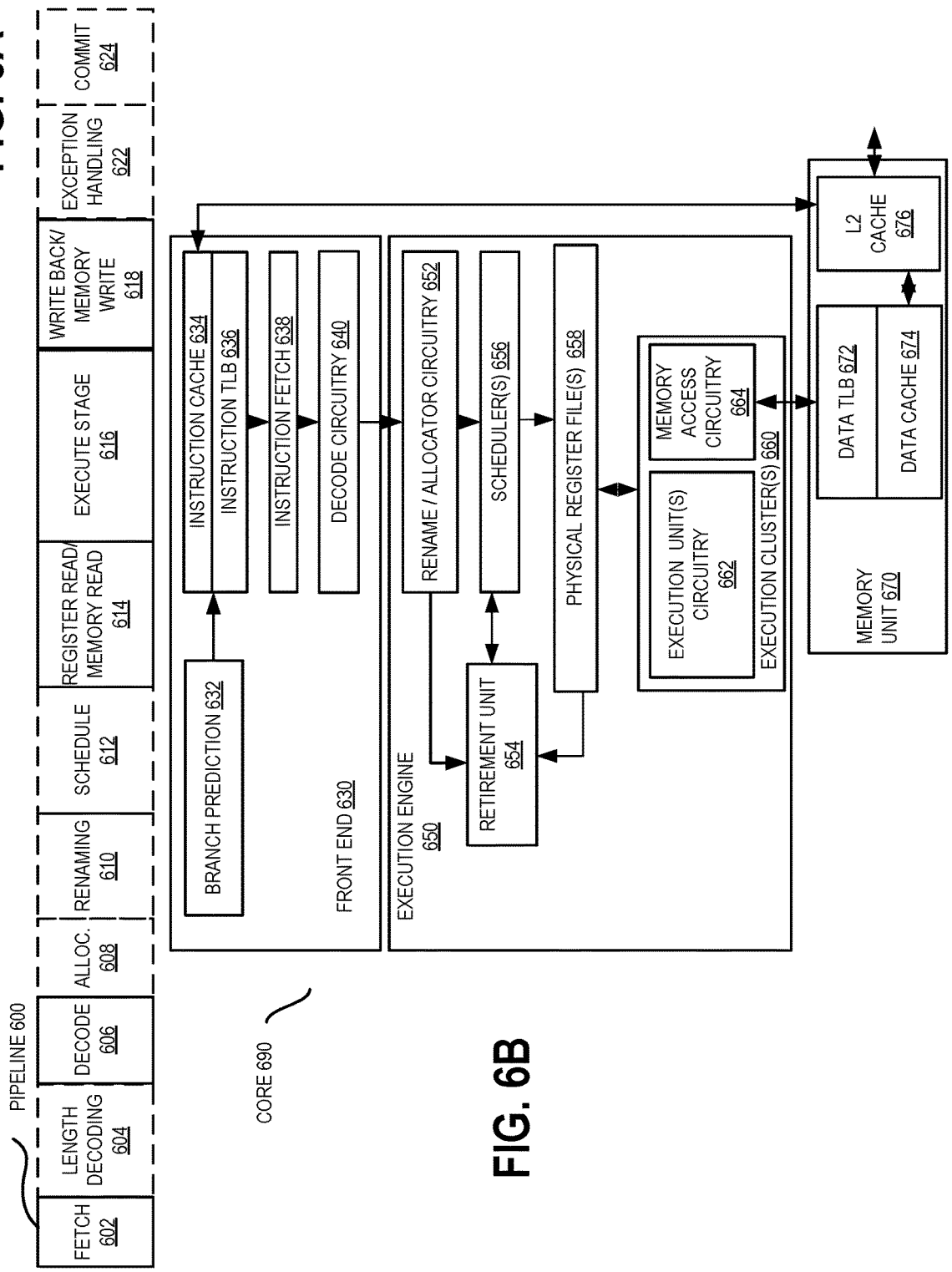
FIG. 6A is a block diagram illustrating both an exemplary in-order pipeline and an exemplary register renaming, out-of-order issue/execution pipeline according to embodiments.
FIG. 6B is a block diagram illustrating both an exemplary embodiment of an in-order architecture core and an exemplary register renaming, out-of-order issue/execution architecture core to be included in a processor according to embodiments.

FIG. 6A is a block diagram illustrating both an exemplary in-order pipeline and an exemplary register renaming, out-of-order issue/execution pipeline according to embodiments. FIG. 6B is a block diagram illustrating both an exemplary embodiment of an in-order architecture core and an exemplary register renaming, out-of-order issue/execution architecture core to be included in a processor according to embodiments. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end unit 630 coupled to an execution engine unit 650, and both are coupled to a memory unit 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 658 comprises a vector registers unit, a writemask registers unit, and a scalar registers unit. These register units may provide architectural vector registers, vector mask registers, and general purpose registers. The physical register file(s) unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 690 includes logic to support a packed data instruction set extension (e.g., AVX1, AVX2), thereby allowing the operations used by many multimedia applications to be performed using packed data.

Figure 7:
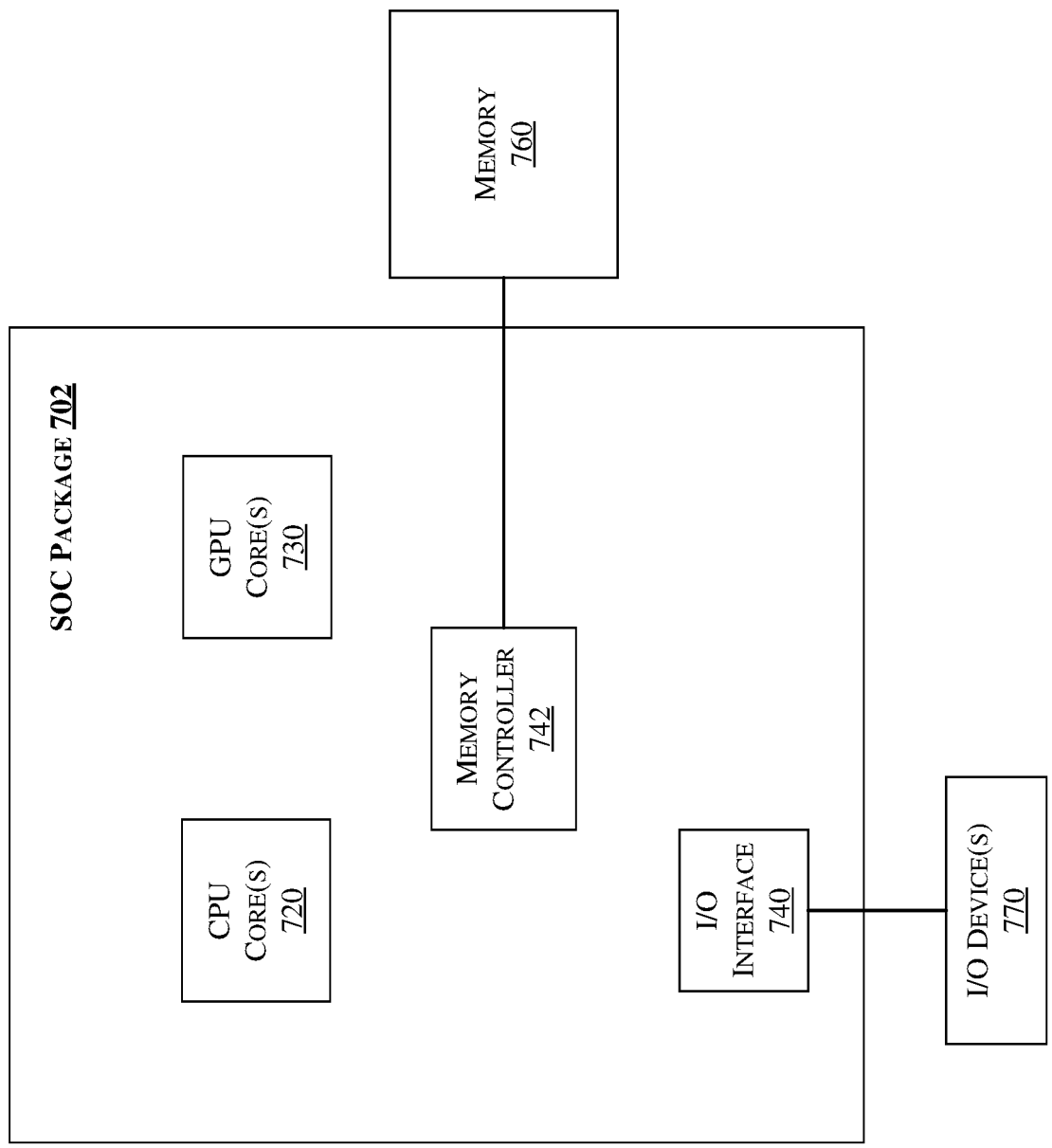
FIG. 7 illustrates a block diagram of an SOC (System On Chip) package in accordance with an embodiment.

FIG. 7 illustrates a block diagram of an SOC package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 702 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device (s) 770 may include one or more of a keyboard, a mouse, a touchpad, a display, an image/video capture device (such as a camera or camcorder/video recorder), a touch screen, a speaker, or the like.

Figure 8:
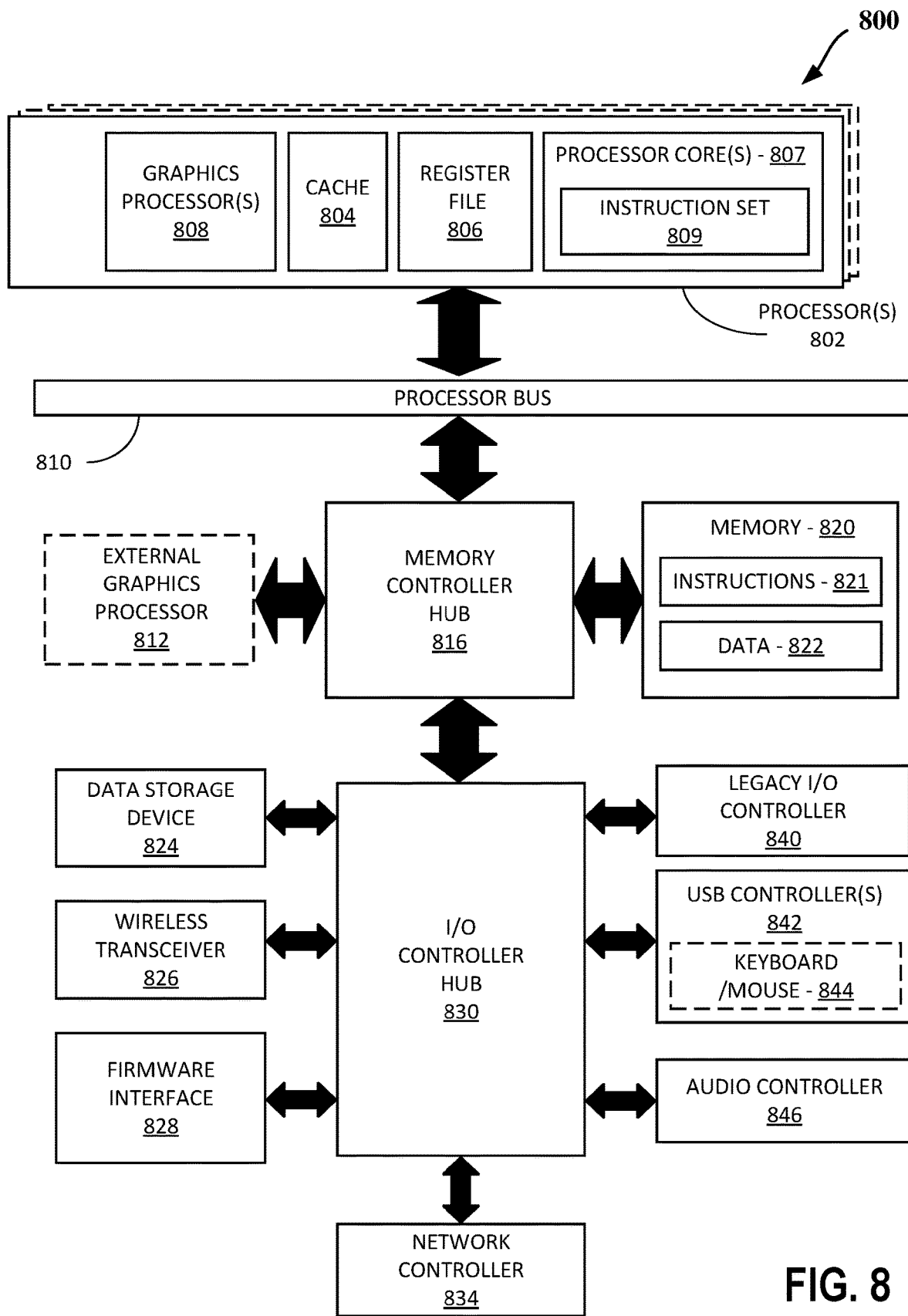
FIG. 8 is a block diagram of a processing system, according to an embodiment.

FIG. 8 is a block diagram of a processing system 800, according to an embodiment. In various embodiments the system 800 includes one or more processors 802 and one or more graphics processors 808, and may be a single processor desktop system, a multiprocessor workstation system, or a server system having a large number of processors 802 or processor cores 807. In on embodiment, the system 800 is a processing platform incorporated within a system-on-a-chip (SoC or SOC) integrated circuit for use in mobile, handheld, or embedded devices.

An embodiment of system 800 can include, or be incorporated within a server-based gaming platform, a game console, including a game and media console, a mobile gaming console, a handheld game console, or an online game console. In some embodiments system 800 is a mobile phone, smart phone, tablet computing device or mobile Internet device. Data processing system 800 can also include, couple with, or be integrated within a wearable device, such as a smart watch wearable device, smart eyewear device, augmented reality device, or virtual reality device. In some embodiments, data processing system 800 is a television or set top box device having one or more processors 802 and a graphical interface generated by one or more graphics processors 808.

In some embodiments, the one or more processors 802 each include one or more processor cores 807 to process instructions which, when executed, perform operations for system and user software. In some embodiments, each of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). Multiple processor cores 807 may each process a different instruction set 809, which may include instructions to facilitate the emulation of other instruction sets. Processor core 807 may also include other processing devices, such a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 is additionally included in processor 802 which may include different types of registers for storing different types of data (e.g., integer registers, floating point registers, status registers, and an instruction pointer register). Some registers may be general-purpose registers, while other registers may be specific to the design of the processor 802.

In some embodiments, processor 802 is coupled to a processor bus 810 to transmit communication signals such as address, data, or control signals between processor 802 and other components in system 800. In one embodiment the system 800 uses an exemplary 'hub' system architecture, including a memory controller hub 816 and an Input Output (I/O) controller hub 830. A memory controller hub 816 facilitates communication between a memory device and other components of system 800, while an I/O Controller Hub (ICH) 830 provides connections to I/O devices via a local I/O bus. In one embodiment, the logic of the memory controller hub 816 is integrated within the processor.

Memory device 820 can be a dynamic random access memory (DRAM) device, a static random access memory (SRAM) device, flash memory device, phase-change memory device, or some other memory device having suitable performance to serve as process memory. In one embodiment the memory device 820 can operate as system memory for the system 800, to store data 822 and instructions 821 for use when the one or more processors 802 executes an application or process. Memory controller hub 816 also couples with an optional external graphics processor 812, which may communicate with the one or more graphics processors 808 in processors 802 to perform graphics and media operations.

In some embodiments, ICH 830 enables peripherals to connect to memory device 820 and processor 802 via a high-speed I/O bus. The I/O peripherals include, but are not limited to, an audio controller 846, a firmware interface 828, a wireless transceiver 826 (e.g., Wi-Fi, Bluetooth), a data storage device 824 (e.g., hard disk drive, flash memory, etc.), and a legacy I/O controller 840 for coupling legacy (e.g., Personal System 2 (PS/2)) devices to the system. One or more Universal Serial Bus (USB) controllers 842 connect input devices, such as keyboard and mouse 844 combinations. A network controller 834 may also couple to ICH 830. In some embodiments, a high-performance network controller (not shown) couples to processor bus 810. It will be appreciated that the system 800 shown is exemplary and not limiting, as other types of data processing systems that are differently configured may also be used. For example, the I/O controller hub 830 may be integrated within the one or more processor 802, or the memory controller hub 816 and I/O controller hub 830 may be integrated into a discreet external graphics processor, such as the external graphics processor 812.

Figure 9:
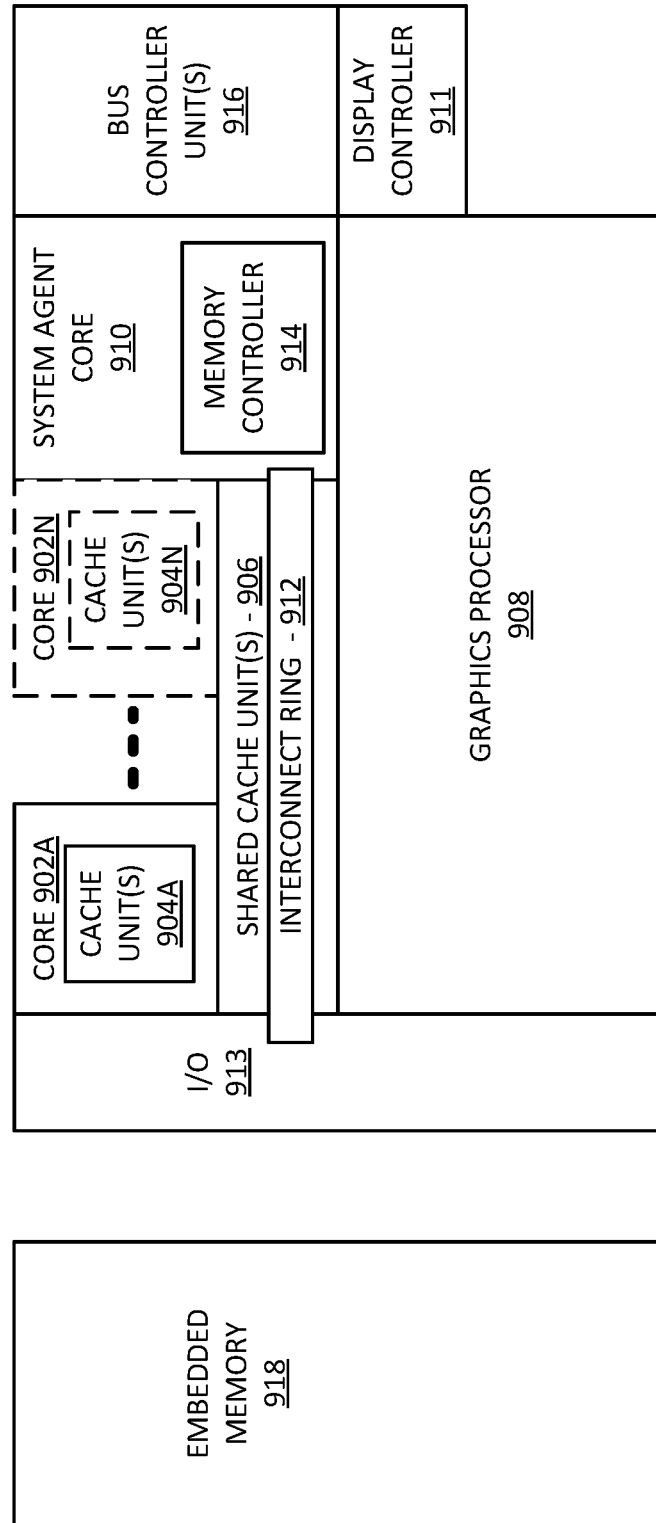
FIG. 9 is a block diagram of an embodiment of a processor having one or more processor cores, according to some embodiments.

FIG. 9 is a block diagram of an embodiment of a processor 900 having one or more processor cores 902A to 902N, an integrated memory controller 914, and an integrated graphics processor 908. Those elements of FIG. 9 having the same reference numbers (or names) as the elements of any other figure herein can operate or function in any manner similar to that described elsewhere herein, but are not limited to such. Processor 900 can include additional cores up to and including additional core 902N represented by the dashed lined boxes. Each of processor cores 902A to 902N includes one or more internal cache units 904A to 904N. In some embodiments each processor core also has access to one or more shared cached units 906.

The internal cache units 904A to 904N and shared cache units 906 represent a cache memory hierarchy within the processor 900. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 906 and 904A to 904N.

In some embodiments, processor 900 may also include a set of one or more bus controller units 916 and a system agent core 910. The one or more bus controller units 916 manage a set of peripheral buses, such as one or more Peripheral Component Interconnect buses (e.g., PCI, PCI Express). System agent core 910 provides management functionality for the various processor components. In some embodiments, system agent core 910 includes one or more integrated memory controllers 914 to manage access to various external memory devices (not shown).

In some embodiments, one or more of the processor cores 902A to 902N include support for simultaneous multi-threading. In such embodiment, the system agent core 910 includes components for coordinating and operating cores 902A to 902N during multi-threaded processing. System agent core 910 may additionally include a power control unit (PCU), which includes logic and components to regulate the power state of processor cores 902A to 902N and graphics processor 908.

In some embodiments, processor 900 additionally includes graphics processor 908 to execute graphics processing operations. In some embodiments, the graphics processor 908 couples with the set of shared cache units 906, and the system agent core 910, including the one or more integrated memory controllers 914. In some embodiments, a display controller 911 is coupled with the graphics processor 908 to drive graphics processor output to one or more coupled displays. In some embodiments, display controller 911 may be a separate module coupled with the graphics processor via at least one interconnect, or may be integrated within the graphics processor 908 or system agent core 910.

In some embodiments, a ring based interconnect unit 912 is used to couple the internal components of the processor 900. However, an alternative interconnect unit may be used, such as a point-to-point interconnect, a switched interconnect, or other techniques, including techniques well known in the art. In some embodiments, graphics processor 908 couples with the ring interconnect 912 via an I/O link 913.

The exemplary I/O link 913 represents at least one of multiple varieties of I/O interconnects, including an on package I/O interconnect which facilitates communication between various processor components and a high-performance embedded memory module 918, such as an eDRAM (or embedded DRAM) module. In some embodiments, each of the processor cores 902 to 902N and graphics processor 908 use embedded memory modules 918 as a shared Last Level Cache.

In some embodiments, processor cores 902A to 902N are homogenous cores executing the same instruction set architecture. In another embodiment, processor cores 902A to 902N are heterogeneous in terms of instruction set architecture (ISA), where one or more of processor cores 902A to 902N execute a first instruction set, while at least one of the other cores executes a subset of the first instruction set or a different instruction set. In one embodiment processor cores 902A to 902N are heterogeneous in terms of microarchitecture, where one or more cores having a relatively higher power consumption couple with one or more power cores having a lower power consumption. Additionally, processor 900 can be implemented on one or more chips or as an SoC integrated circuit having the illustrated components, in addition to other components.

Figure 10:
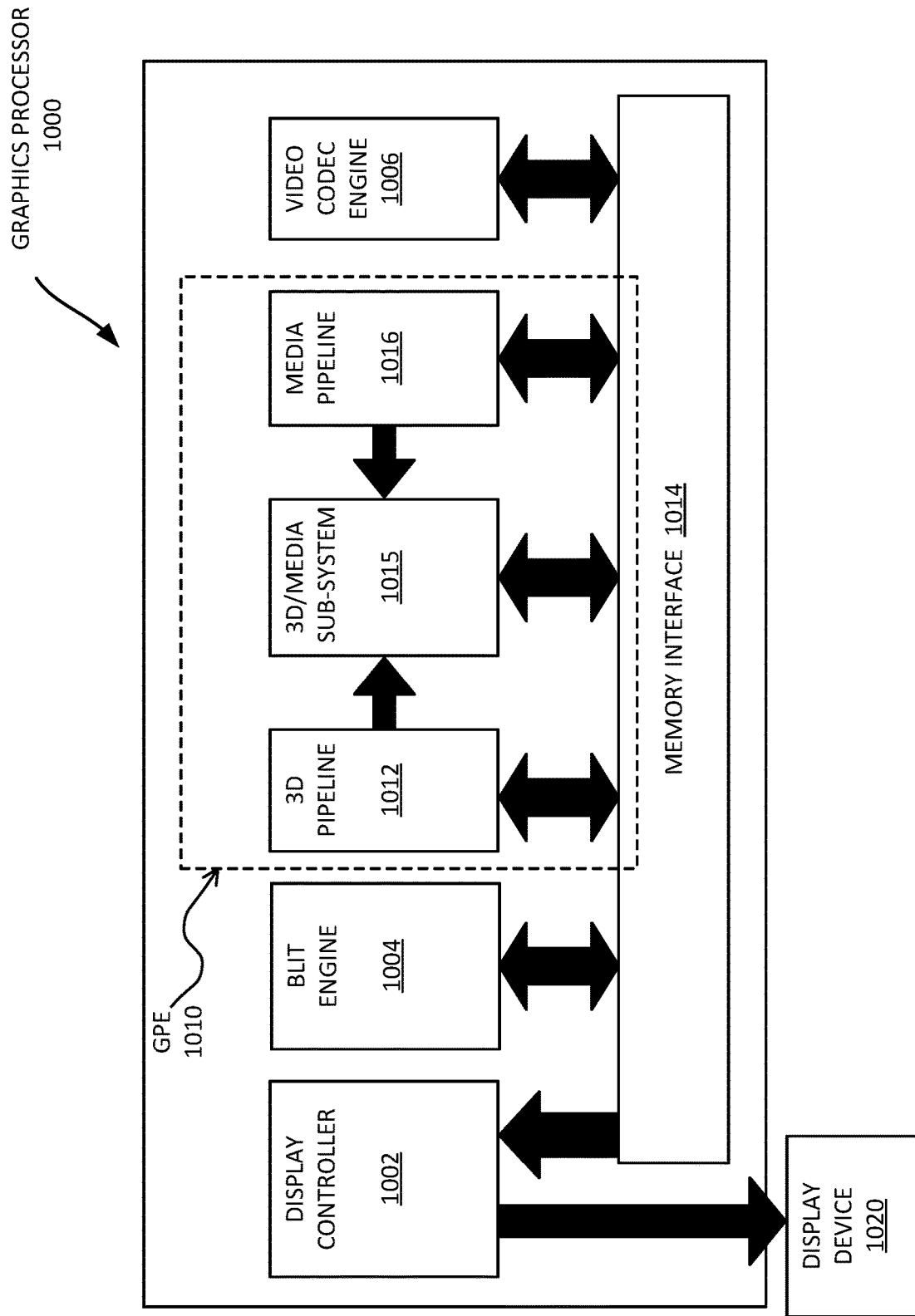
FIG. 10 is a block diagram of a graphics processor, according to an embodiment.

FIG. 10 is a block diagram of a graphics processor 1000, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1000 includes a memory interface 1014 to access memory. Memory interface 1014 can be an interface to local memory, one or more internal caches, one or more shared external caches, and/or to system memory.

In some embodiments, graphics processor 1000 also includes a display controller 1002 to drive display output data to a display device 1020. Display controller 1002 includes hardware for one or more overlay planes for the display and composition of multiple layers of video or user interface elements. In some embodiments, graphics processor 1000 includes a video codec engine 1006 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 321M/VC-1, and Joint Photographic Experts Group (JPEG) formats such as JPEG, and Motion JPEG (MJPEG) formats.

In some embodiments, graphics processor 1000 includes a block image transfer (BLIT) engine 1004 to perform two-dimensional (2D) rasterizer operations including, for example, bit-boundary block transfers. However, in one embodiment, 3D graphics operations are performed using one or more components of graphics processing engine (GPE) 1010. In some embodiments, graphics processing engine 1010 is a compute engine for performing graphics operations, including three-dimensional (3D) graphics operations and media operations.

In some embodiments, GPE 1010 includes a 3D pipeline 1012 for performing 3D operations, such as rendering three-dimensional images and scenes using processing functions that act upon 3D primitive shapes (e.g., rectangle, triangle, etc.). The 3D pipeline 1012 includes programmable and fixed function elements that perform various tasks within the element and/or spawn execution threads to a 3D/Media sub-system 1015. While 3D pipeline 1012 can be used to perform media operations, an embodiment of GPE 1010 also includes a media pipeline 1016 that is specifically used to perform media operations, such as video post-processing and image enhancement.

In some embodiments, media pipeline 1016 includes fixed function or programmable logic units to perform one or more specialized media operations, such as video decode acceleration, video de-interlacing, and video encode acceleration in place of, or on behalf of video codec engine 1006. In some embodiments, media pipeline 10160 additionally includes a thread spawning unit to spawn threads for execution on 3D/Media sub-system 1015. The spawned threads perform computations for the media operations on one or more graphics execution units included in 3D/Media sub-system 1015.

In some embodiments, 3D/Media subsystem 1015 includes logic for executing threads spawned by 3D pipeline 1012 and media pipeline 1016. In one embodiment, the pipelines send thread execution requests to 3D/Media sub-system 1015, which includes thread dispatch logic for arbitrating and dispatching the various requests to available thread execution resources. The execution resources include an array of graphics execution units to process the 3D and media threads. In some embodiments, 3D/Media subsystem 1015 includes one or more internal caches for thread instructions and data. In some embodiments, the subsystem also includes shared memory, including registers and addressable memory, to share data between threads and to store output data.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

The following examples pertain to further embodiments. Example 1 includes an apparatus comprising: memory to store data; and a processor having execution circuitry to execute an instruction to program an inline memory expansion logic and a host memory encryption logic with one or more cryptographic keys, wherein the inline memory expansion logic is to encrypt the data to be written to the memory and to decrypt encrypted data to be read from the memory, wherein the memory is coupled to the processor via an interconnect endpoint of a system fabric. Example 2 includes the apparatus of example 1, wherein the interconnect endpoint is to operate in accordance with Compute Express Link™ (CXL™) protocol. Example 3 includes the apparatus of example 1, wherein the memory comprises a one level memory or a two level memory. Example 4 includes the apparatus of example 1, wherein the memory is to be accessed in block mode or direct access mode. Example 5 includes the apparatus of example 1, wherein the host memory encryption logic is to encrypt data to be written to dynamic random access memory and to decrypt encrypted data to be read from the dynamic random access memory, wherein the processor is coupled to the dynamic random access memory via a memory fabric endpoint of a system fabric. Example 6 includes the apparatus of example 5, wherein the memory and the dynamic random access memory are to be accessible as a single system main memory. Example 7 includes the apparatus of example 5, wherein the memory is a far memory in a two level memory system and the dynamic random access memory is a near memory in the two level memory system. Example 8 includes the apparatus of example 1, wherein the processor, the memory, inline memory expansion logic, the interconnect endpoint, and the system fabric are on a same integrated circuit device.

Example 9 includes a method comprising: storing data in memory; and executing an instruction, at execution circuitry of a processor, to program an inline memory expansion logic and a host memory encryption logic with one or more cryptographic keys, wherein the inline memory expansion logic encrypts the data to be written to the memory and decrypts encrypted data to be read from the memory, wherein the memory is coupled to the processor via an interconnect endpoint of a system fabric. Example 10 includes the method of example 9, wherein the interconnect endpoint operates in accordance with Compute Express Link™ (CXL™) protocol. Example 11 includes the method of example 9, wherein the memory comprises a one level memory or a two level memory. Example 12 includes the method of example 9, further comprising accessing the memory in block mode or direct access mode. Example 13 includes the method of example 9, further comprising the host memory encryption logic encrypting data to be written to dynamic random access memory and decrypting encrypted data to be read from the dynamic random access memory, wherein the processor is coupled to the dynamic random access memory via a memory fabric endpoint of a system fabric. Example 14 includes the method of example 13, further comprising accessing the memory and the dynamic random access memory as a single system main memory. Example 15 includes the method of example 13, wherein the memory is a far memory in a two level memory system and the dynamic random access memory is a near memory in the two level memory system.

Example 16 includes one or more non-transitory computer-readable media comprising one or more instructions that when executed on a processor configure the processor to perform one or more operations to: store data in memory; and execute an instruction, at execution circuitry of the processor, to program an inline memory expansion logic and a host memory encryption logic with one or more cryptographic keys, wherein the inline memory expansion logic is to encrypt the data to be written to the memory and to decrypt encrypted data to be read from the memory, wherein the memory is coupled to the processor via an interconnect endpoint of a system fabric. Example 17 includes the one or more computer-readable media of example 16, further comprising one or more instructions that when executed on the at least one processor configure the at least one processor to perform one or more operations to cause the interconnect endpoint to operate in accordance with Compute Express Link™ (CXL™) protocol. Example 18 includes the one or more computer-readable media of example 16, further comprising one or more instructions that when executed on the at least one processor configure the at least one processor to perform one or more operations to cause the memory to be accessed in block mode or direct access mode. Example 19 includes the one or more computer-readable media of example 16, further comprising one or more instructions that when executed on the at least one processor configure the at least one processor to perform one or more operations to cause the host memory encryption logic to encrypt data to be written to dynamic random access memory and to decrypt encrypted data to be read from the dynamic random access memory, wherein the processor is coupled to the dynamic random access memory via a memory fabric endpoint of a system fabric. Example 20 includes the one or more computer-readable media of example 16, wherein the memory comprises a one level memory or a two level memory.

Example 21 includes an apparatus comprising: a system fabric to couple interconnect attached non-volatile memory and volatile memory to a processor; and an inline memory expansion logic, coupled to an interconnect endpoint of the system fabric, to encrypt data to be written to the interconnect attached non-volatile memory and to decrypt encrypted data to be read from the interconnect attached non-volatile memory, wherein the interconnect endpoint is to operate in accordance with Compute Express Link™ (CXL™) protocol. Example 22 includes the apparatus of example 21, wherein the interconnect attached non-volatile memory is to be accessed in block mode or direct access mode. Example 23 includes the apparatus of example 21, comprising host memory encryption logic is to encrypt data to be written to the volatile memory and to decrypt encrypted data to be read from the volatile memory. Example 24 includes the apparatus of example 21, wherein the interconnect attached non-volatile memory and the volatile memory are to be accessible as a single system main memory by the processor. Example 25 includes the apparatus of example 21, wherein the interconnect attached non-volatile memory is a far memory in a two level memory system and the volatile memory is a near memory in the two level memory system. Example 26 includes the apparatus of example 21, wherein one or more of the processor, the interconnect attached non-volatile memory, inline memory expansion logic, the interconnect endpoint, and the system fabric are on a same integrated circuit device.

Example 27 includes one or more non-transitory computer-readable media comprising one or more instructions that when executed on a processor configure the processor to perform one or more operations to cause: an inline memory expansion logic, coupled to an interconnect endpoint of a system fabric, to encrypt data to be written to an interconnect attached non-volatile memory and to decrypt encrypted data to be read from the interconnect attached non-volatile memory, wherein the system fabric couples the interconnect attached non-volatile memory and volatile memory to a processor wherein the interconnect endpoint is to operate in accordance with Compute Express Link™ (CXL™) protocol. Example 28 includes the one or more computer-readable media of example 27, further comprising one or more instructions that when executed on the at least one processor configure the at least one processor to perform one or more operations to cause the interconnect attached non-volatile memory to be accessed in block mode or direct access mode. Example 29 includes the one or more computer-readable media of example 27, further comprising one or more instructions that when executed on the at least one processor configure the at least one processor to perform one or more operations to cause host memory encryption logic to encrypt data to be written to the volatile memory and to decrypt encrypted data to be read from the volatile memory.

Example 30 includes an apparatus comprising means to perform a method as set forth in any preceding example. Example 31 includes machine-readable storage including machine-readable instructions, when executed, to implement a method or realize an apparatus as set forth in any preceding example.

In various embodiments, the operations discussed herein, e.g., with reference to FIG. 1 et seq., may be implemented as hardware (e.g., logic circuitry or more generally circuitry or circuit), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIG. 1 et seq.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a system fabric to couple interconnect attached non-volatile memory and volatile memory to a processor; and
an inline memory expansion logic, coupled to an interconnect endpoint of the system fabric, to encrypt data to be written to the interconnect attached non-volatile memory and to decrypt encrypted data to be read from the interconnect attached non-volatile memory, wherein the interconnect endpoint is to operate in accordance with Compute Express Link™ (CXL™) protocol, wherein the memory is to be accessed in a block mode, wherein, for a received block mode transaction in the block mode, the inline memory expansion logic is to encrypt the data or decrypt the encrypted data based at least in part on a block size of the received block mode transaction and a tweak, wherein the tweak is to be based at least in part on an address of the received block mode transaction or a nonce associated with the received block mode transaction.

2. The apparatus of claim 1, wherein the interconnect attached non-volatile memory is to be accessed in a direct access mode.

3. The apparatus of claim 1, comprising host memory encryption logic is to encrypt data to be written to the volatile memory and to decrypt encrypted data to be read from the volatile memory.

4. The apparatus of claim 1, wherein the interconnect attached non-volatile memory and the volatile memory are to be accessible as a single system main memory by the processor.

5. The apparatus of claim 1, wherein the interconnect attached non-volatile memory is a far memory in a two level memory system and the volatile memory is a near memory in the two level memory system.

6. The apparatus of claim 1, wherein one or more of the processor, the interconnect attached non-volatile memory, inline memory expansion logic, the interconnect endpoint, and the system fabric are on a same integrated circuit device.

7. A method comprising:
an inline memory expansion logic, coupled to an interconnect endpoint of a system fabric, to encrypt data to be written to an interconnect attached non-volatile memory and to decrypt encrypted data to be read from the interconnect attached non-volatile memory,
wherein the system fabric couples the interconnect attached non-volatile memory and volatile memory to a processor,
wherein the interconnect endpoint operates in accordance with Compute Express Link™ (CXL™) protocol, wherein the memory is accessed in a block mode, wherein, for a received block mode transaction in the block mode, the inline memory expansion logic encrypts the data or decrypts the encrypted data based at least in part on a block size of the received block mode transaction and a tweak, wherein the tweak is based at least in part on an address of the received block mode transaction or a nonce associated with the received block mode transaction.

8. The method of claim 7, further comprising causing the interconnect attached non-volatile memory to be accessed in a direct access mode.

9. The method of claim 7, further comprising causing host memory encryption logic to encrypt data to be written to the volatile memory and to decrypt encrypted data to be read from the volatile memory.

10. The method of claim 7, wherein the interconnect attached non-volatile memory and the volatile memory are accessible as a single system main memory by the processor.

11. The method of claim 7, wherein the interconnect attached non-volatile memory is a far memory in a two level memory system and the volatile memory is a near memory in the two level memory system.

12. The method of claim 7, wherein one or more of the processor, the interconnect attached non-volatile memory, inline memory expansion logic, the interconnect endpoint, and the system fabric are on a same integrated circuit device.

13. One or more non-transitory computer-readable media comprising one or more instructions that when executed on a processor configure the processor to perform one or more operations to cause:

an inline memory expansion logic, coupled to an interconnect endpoint of a system fabric, to encrypt data to be written to an interconnect attached non-volatile memory and to decrypt encrypted data to be read from the interconnect attached non-volatile memory,
wherein the system fabric couples the interconnect attached non-volatile memory and volatile memory to a processor,
wherein the interconnect endpoint is to operate in accordance with Compute Express Link™ (CXL™) protocol, wherein the memory is to be accessed in a block mode, wherein, for a received block mode transaction in the block mode, the inline memory expansion logic is to encrypt the data or decrypt the encrypted data based at least in part on a block size of the received block mode transaction and a tweak, wherein the tweak is to be based at least in part on an address of the received block mode transaction or a nonce associated with the received block mode transaction.

14. The one or more computer-readable media of claim 13, further comprising one or more instructions that when executed on the at least one processor configure the at least one processor to perform one or more operations to cause the interconnect attached non-volatile memory to be accessed in a direct access mode.

15. The one or more computer-readable media of claim 13, further comprising one or more instructions that when executed on the at least one processor configure the at least one processor to perform one or more operations to cause host memory encryption logic to encrypt data to be written to the volatile memory and to decrypt encrypted data to be read from the volatile memory.

16. The one or more computer-readable media of claim 13, wherein the interconnect attached non-volatile memory and the volatile memory are accessible as a single system main memory by the processor.

17. The one or more computer-readable media of claim 13, wherein the interconnect attached non-volatile memory is a far memory in a two level memory system and the volatile memory is a near memory in the two level memory system.

18. The one or more computer-readable media of claim 13, wherein one or more of the processor, the interconnect attached non-volatile memory, inline memory expansion logic, the interconnect endpoint, and the system fabric are on a same integrated circuit device.

* * * * *